3,379,115
INSTALLATION FOR THE STERILIZATION OR PASTEURIZATION OF COMMODITIES PACKED IN CONTAINERS
Johannes Bernardus van der Winden, Amstelveen, Netherlands, assignor to Gebr. Stork & Co's Apparatenfabriek N.V., a corporation of the Netherlands
Filed Aug. 8, 1966, Ser. No. 570,897
Claims priority, application Netherlands, Mar. 9, 1966, 66—3,058
4 Claims. (Cl. 99—249)

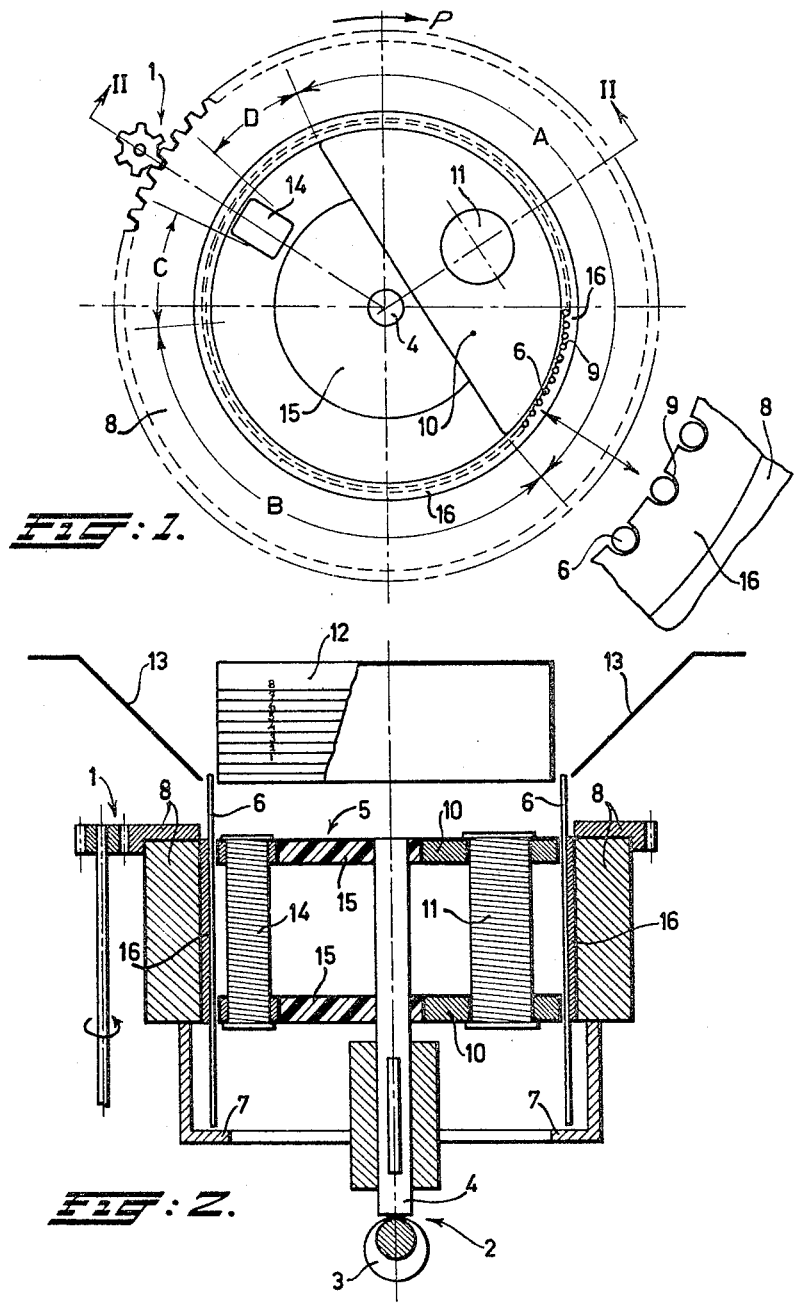

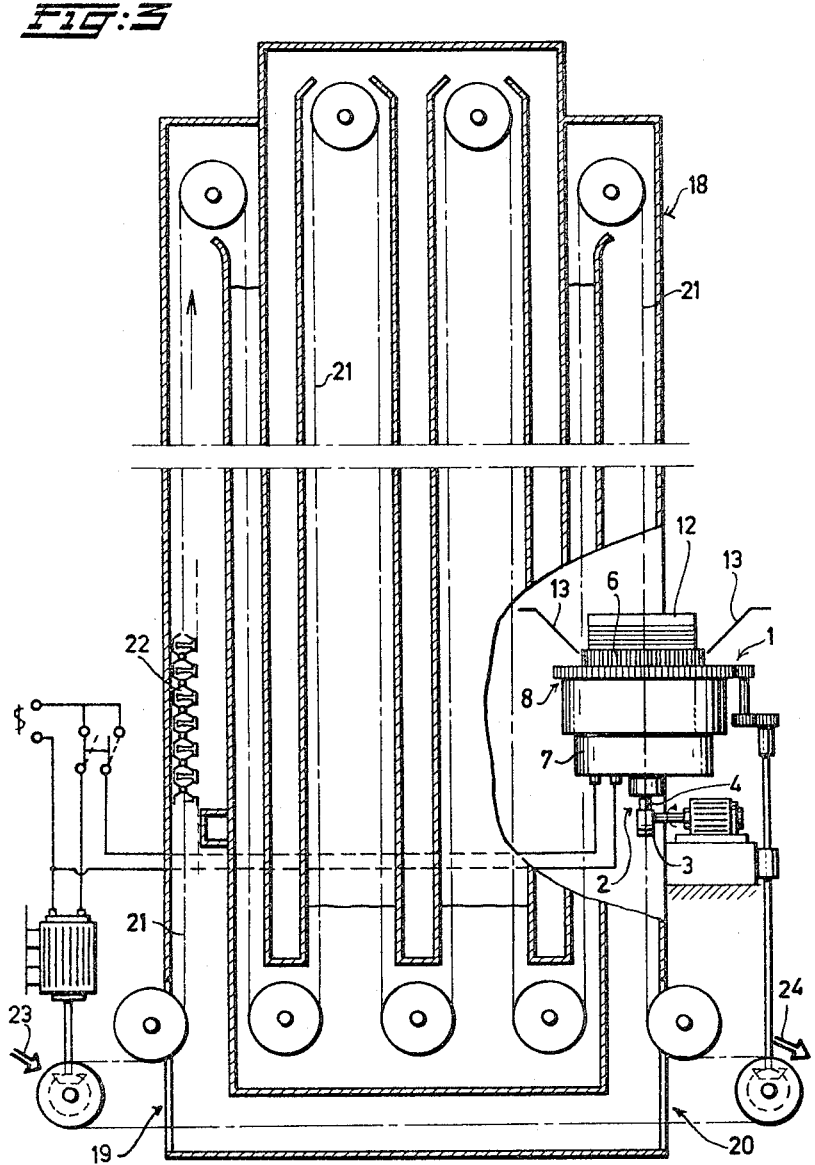

ABSTRACT OF THE DISCLOSURE

A device for an installation for the sterilization or pasteurization of commodities packed in containers, said device including a drive synchronized with the advance of a conveyor which transports the containers through a treatment zone in the installation, and a number of mark members transported by the drive and functionally associated with the containers for indicating which containers may have remained in the treatment zone in excess of the desired dwelling time.

---

My invention relates to an installation for the sterilization or pasteurization of commodities packed in containers, such as beverages or food stuffs packed in tins or glass, the installation comprising a treatment space with an inlet and outlet through which advances an endless conveyor, carriers for the containers to be treated being secured to the conveyor, the said carriers being loaded and unloaded at a station outside of the treatment space. Various embodiments of such a device are known.

It occurs sometimes that owing to unexpected circumstances the advance of the conveyor is interrupted e.g. on account of a stagnation in the discharge or if an overload is produced within the installation and the drive of the conveyor is put out of action. When this inconvenience has been corrected and the conveyor is again set into movement, a number of carriers have been stationary in the treatment space for some time, which means that the containers in said carriers have been definitely subjected to a treatment of longer duration than the desired and previously determined one. This means for some products that the taste has deteriorated or that in another respect the normal requirements can no longer be satisfied. Consequently it is essential to remove these containers from the production line preferably without taking along other containers which have not been subjected to a prolonged thermal treatment. The industry therefore needs a device which during the discharge of the containers from the installation indicates precisely which containers or which group of containers have dwelled longer in the treatment space than originally had been planned.

It is a first object of the invention to satisfy this need.

A further object of the invention is to provide an entirely mechanically operating device which is very dependable and which can be arranged at the outlet of the installation, so that in a simple way it becomes possible to ascertain which of the containers or group of containers, has been subjected to a treatment longer than desired.

It is another object of the invention to obtain a very compact construction.

The foregoing and other objects and advantages of the invention will appear in the description to follow.

In the description reference is made to the accompanying drawings, which form a part thereof, and in which there is shown by way of illustration and not of limitation a specific form in which the invention may be embodied.

In the drawings:

FIG. 1 is a plan view of the central part of this device,

FIG. 2 is an axial section on the line II—II in FIG. 1, and

FIG. 3 is an elevational view of a conventional installation in which the device of FIGS. 1 and 2 is installed.

The installation as shown in FIG. 3 comprises a treatment space 18 with an inlet 19 and outlet 20 through which an endless conveyor 21 advances, carriers 22 for the containers to be treated (preserved food tins or glass jars) being secured to the conveyor. The carriers are loaded and unloaded at stations 23, 24 respectively, situated outside of the treatment space 18. Disposed in the vicinity of this discharge station 24 is a device for reading the dwelling time of each carrier or group of carriers in the treatment space.

For that purpose this device is provided with a drive 1 moving synchronously with the advance of the conveyor. There is further a motion mechanism 2 for generating a repeated periodical displacement. According to this embodiment this mechanism is constituted by a rotary cam 3 cooperating with a rod 4 to which is secured a disc shaped member 5 to be described hereinafter. This device is finally provided with a plurality of mark members 6 which are functionally associated with one or more carriers of the installation. This functional association consists for instance in that there are as many mark members 6 as carriers in the conveyor of the installation according to the invention. It is however, also possible to apply one mark member for a group of carriers, since there may be a considerable number of carriers in the conveyor and a corresponding great number of mark members 6 would result in a too large size of the device.

In this embodiment these mark members 6 consist of rods which in their position of rest (shown in FIG. 2) are bearing on a flange 7.

The drive 1 is connected with a ring 8 of magnetic material or an electromagnet, the said ring along its inner wall being provided with a plurality of locations 9 for the rods 6. Due to the magnetic force these rods are held in place; they rotate, however, together with the ring 8 which is advanced by the drive 1 in the direction of the arrow P. This drive is coupled to the conveyor of the installation, so that on passing a carrier or a group of carriers through the discharge station of the installation, also one of the rods 6 passes along a definite point in the device.

The motion mechanism 2 is activated for the periodical displacement of the rods 6 in an upward direction as soon as there is a disturbance in the installation. For that purpose the disc shaped member 5 is provided with a sector of a circle 10 of magnetizable material. This sector is disposed within the ring 8 and is periodically moved up and down in a direction parallel to the axis of rotation of the ring. Disposed within this sector 10 is a magnetizing coil 11, which coil during a disturbance is periodically energized during each upward stroke of the member 5 or during each fifth or tenth upward stroke. When the coil 11 is energized, a magnetic field is created which is stronger than the force of the ring 8, so that the rods situated opposite the sector 10 are dragged along in an upward direction over a small distance. The length of the arc of the sector 10 corresponds with the time during which the carriers stay within the treatment space of the installation. In FIG. 1 this is indicated by an arc A. The arcs B–D correspond to the cooling track, discharge station and filling station, respectively of the installation.

When owing to any cause the advance of the conveyor of the installation is temporarily interrupted, the drive 1 comes likewise to a standstill, whereas the motion mechanism 2 due to the energization of the coil 11 becomes active. As a result the rods 6 lying in the arc A, and therefore functionally associated with the carriers situated within the treatment space of the installation at that moment, are stepwise displaced in an upward direction. When the trouble in the installation is overcome and the conveyor advances again normally, the coil 11 is no longer energized. The drive 1 will again rotate the ring 8 whereupon the rods 6 leaving the arc B and entering the arc C (see FIG. 1) will indicate exactly which carriers or group of carriers have been within the treatment space for a time longer than was intended. This can be read from the scale 12, a mirror 13 being provided in order to facilitate reading. The operators can now remove all containers from the carriers which according to the position of the associated rods 6 have stayed too long within the treatment space, and this can be done without taking away those containers which have been subjected to the correct treatment time.

Situated within the disc shaped member 5 and between the arcs C and D is a second excitable coil 14, which is mounted in two plastic plates 15. The coil 14 is periodically energized during the downward movement of the member 5 so that all passing rods 6 are again returned to their initial position in which these rods bear on the flange 7 which is connected with the ring 8.

The inner face of the ring 8 is constituted by a thin sleeve 16 of yellow copper which sleeve is provided with recesses 9 for the rods 6.

It should be noted that within the scope of the invention the depicted embodiment can be modified in various ways. The rods 6 could, for example, be disposed on the outer side of a rotary disc, a ring outside of this disc being periodically moved up and down. It is further possible to arrange the rods 6 radially in a plane, a mechanical drive, being active, for example, by means of a nut and screw thread, during a disturbance in the installation and moving the rods radially towards the exterior according to the excess dwelling time of the carriers within the treatment space in comparison with the intended one. Such an embodiment is, however, less advantageous in that rather a large device is necessary contrary to the preferred embodiment according to the invention which requires a very compact device. Such a compact device can be easily arranged in the proximity of the discharge station of an installation for the sterilization or pasteurisation of commodities packed in containers.

While preferred embodiments of the invention have been shown and described, it is to be understood that changes and variations may be made without departing from the spirit and scope of the invention as defined in the appended claims.

I claim:
1. An installation for the treatment of commodities packed in containers, the installation having a treatment space with an inlet and outlet through which advances and endless conveyor, carriers for the containers to be treated being secured to the conveyor, the said carriers being loaded and unloaded at respective stations outside of the treatment space, said installation comprising a device for indicating those carriers which have remained in excess of the desired dwelling time in the treatment space, the said device including:
   a drive synchronized with the advance of the conveyor;
   a motion mechanism for generating a repeated periodical displacement; and
   a number of mark members which are functionally associated with one or more carriers, said mark members being movable with said drive and responsive to the action of the motion mechanism for indicating which carriers have remained in excess of the desired dwelling time in the treatment space.

2. An installation according to claim 1, wherein the device comprises a ring which is rotated by the drive and which on a face thereof is provided with a number of locations for receiving the mark members, said mark members being rods, said motion mechanism being activated for periodically displacing the rods.

3. An installation according to claim 2, wherein said ring consists of magnetic material and the locations are provided in the inner wall of the ring concentric with the axis of rotation of the ring, the motion mechanism comprising a sector of a circle of magnetizable material, disposed within the ring, which sector is periodically moved up and down in a direction parallel to the axis of rotation of the ring, and a magnetizing coil in the sector, said coil being periodically energized.

4. An installation according to claim 3, comprising an excitable coil disposed in the plane of the sector and at a position outside of this sector but at a short distance from the inner wall, said coil serving to return the rods to their initial position.

References Cited

UNITED STATES PATENTS

| | | | |
|---|---|---|---|
| 1,570,236 | 1/1926 | Fooks | 99—362 X |
| 2,549,216 | 4/1951 | Martin | 99—249 |
| 3,255,690 | 6/1966 | Schack et. al. | 99—249 |

ROBERT W. JENKINS, *Primary Examiner.*